United States Patent
Casaldi et al.

(10) Patent No.: US 6,779,578 B2
(45) Date of Patent: Aug. 24, 2004

(54) MASTER PROCESSING APPARATUS WITH EJECTOR MECHANISM

(75) Inventors: Heath E Casaldi, Scottsdale, AZ (US); Ronald J. Hoffman, Phoenix, AZ (US)

(73) Assignee: Xyron, Inc., Scottsdale, AZ (US)

( * ) Notice: Subject to any disclaimer, the term of this patent is extended or adjusted under 35 U.S.C. 154(b) by 0 days.

(21) Appl. No.: 10/178,615

(22) Filed: Jun. 25, 2002

(65) Prior Publication Data

US 2003/0234082 A1 Dec. 25, 2003

(51) Int. Cl.$^7$ ............................. B32B 31/00
(52) U.S. Cl. ................... 156/555; 156/522; 156/582
(58) Field of Search ..................... 156/522, 555, 156/580, 582, 583.1; 100/155 R, 160, 176

(56) References Cited

U.S. PATENT DOCUMENTS

| | | | |
|---|---|---|---|
| 3,962,021 A | * 6/1976 | Weisfeld | ............... 156/499 |
| 4,498,950 A | 2/1985 | Sato et al. | |
| 4,552,610 A | 11/1985 | Sato et al. | |
| 5,069,732 A | 12/1991 | Levine | |
| 5,275,684 A | 1/1994 | Marazzi et al. | |
| 5,346,580 A | 9/1994 | Elges et al. | ............... 156/540 |
| 5,435,882 A | 7/1995 | Azamar et al. | |
| 5,580,417 A | 12/1996 | Bradshaw | |
| 5,584,962 A | 12/1996 | Bradshaw et al. | |
| 5,587,044 A | 12/1996 | Goto | |
| 5,725,726 A | 3/1998 | Yu | |
| 5,735,998 A | * 4/1998 | Bradshaw | ............... 156/495 |
| 5,788,806 A | 8/1998 | Bradshaw et al. | |
| 5,961,779 A | * 10/1999 | Bradshaw | ............... 156/495 |
| 6,113,293 A | 9/2000 | Schanke et al. | |
| 6,244,322 B1 | 6/2001 | Paque | |
| 6,270,612 B1 | 8/2001 | Bradshaw | |
| 6,422,281 B1 | 7/2002 | Ensign, Jr. et al. | ......... 156/495 |
| 6,427,744 B2 | * 8/2002 | Seki et al. | ............... 156/353 |
| 6,527,028 B2 | 3/2003 | Miller | ............... 156/555 |
| 6,576,080 B1 | 6/2003 | Velasquez et al. | ......... 156/298 |
| 2002/0059980 A1 | 5/2002 | Lemens et al. | ............... 156/269 |
| 2003/0015281 A1 | 1/2003 | Kvamme et al. | ........... 156/238 |

FOREIGN PATENT DOCUMENTS

WO         WO 00/66350         11/2000

* cited by examiner

Primary Examiner—James Sells
(74) Attorney, Agent, or Firm—Pillsbury Winthrop LLP

(57) ABSTRACT

A master processing system includes a frame and a cartridge assembly having a cartridge body and first and second feed rolls rotatably mounted to the cartridge body. The first and second feed rolls carry first and second stock materials with at least one of the stock materials having a layer of adhesive disposed thereon. The cartridge body is removably mounted to the frame. A master processing assembly is constructed and arranged such that a master can be inserted into the processing assembly together with the stock materials unwound from their feed rolls and disposed on opposing sides of the master. The processing assembly performs a master processing operation, wherein the processing assembly causes adhesive bonding between the master and the stock materials being fed therein. An ejector mechanism is constructed and arranged to eject the cartridge assembly in an outward direction with respect to the frame.

59 Claims, 9 Drawing Sheets

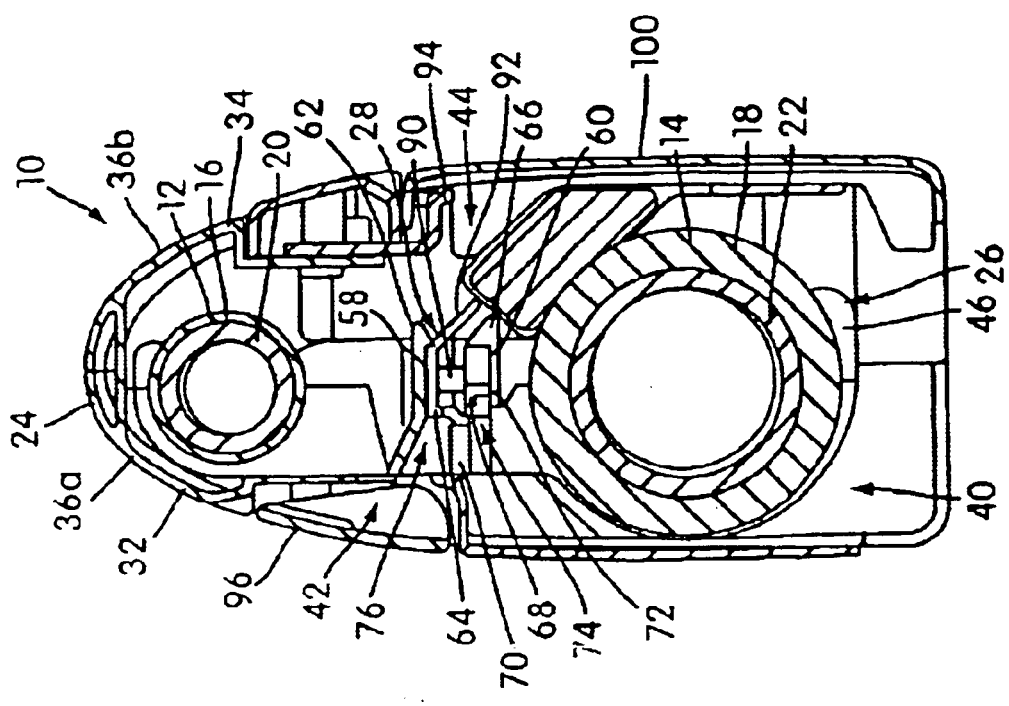
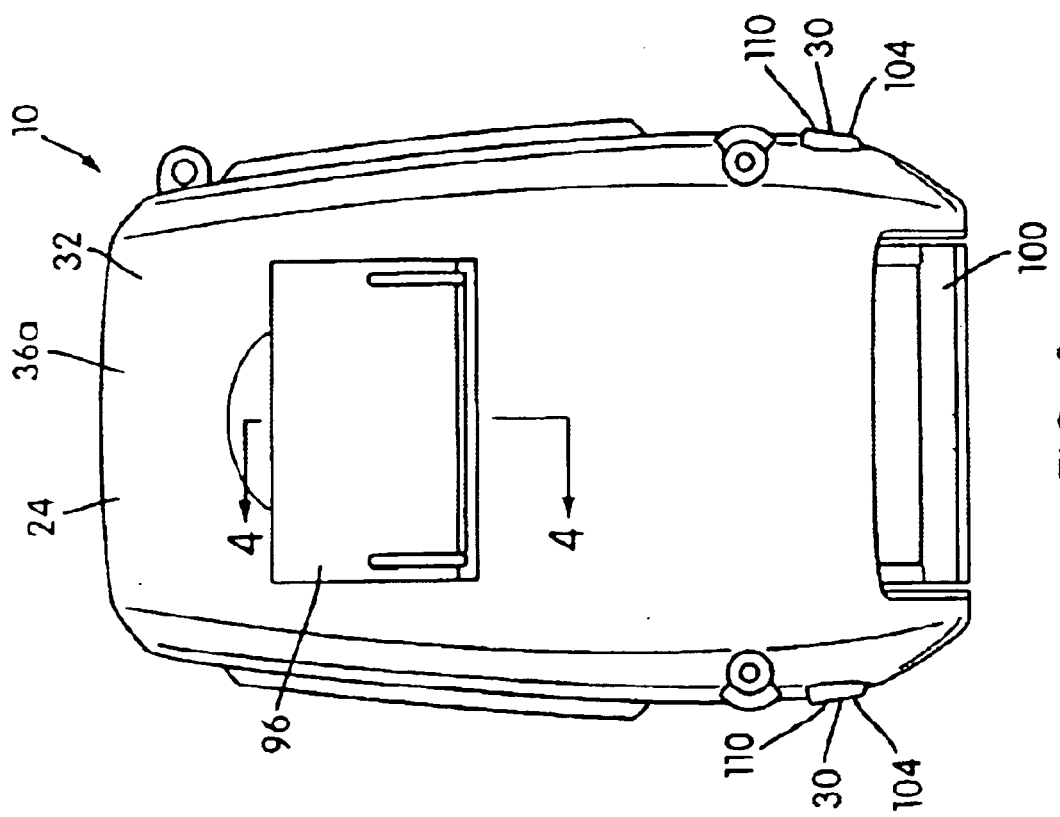

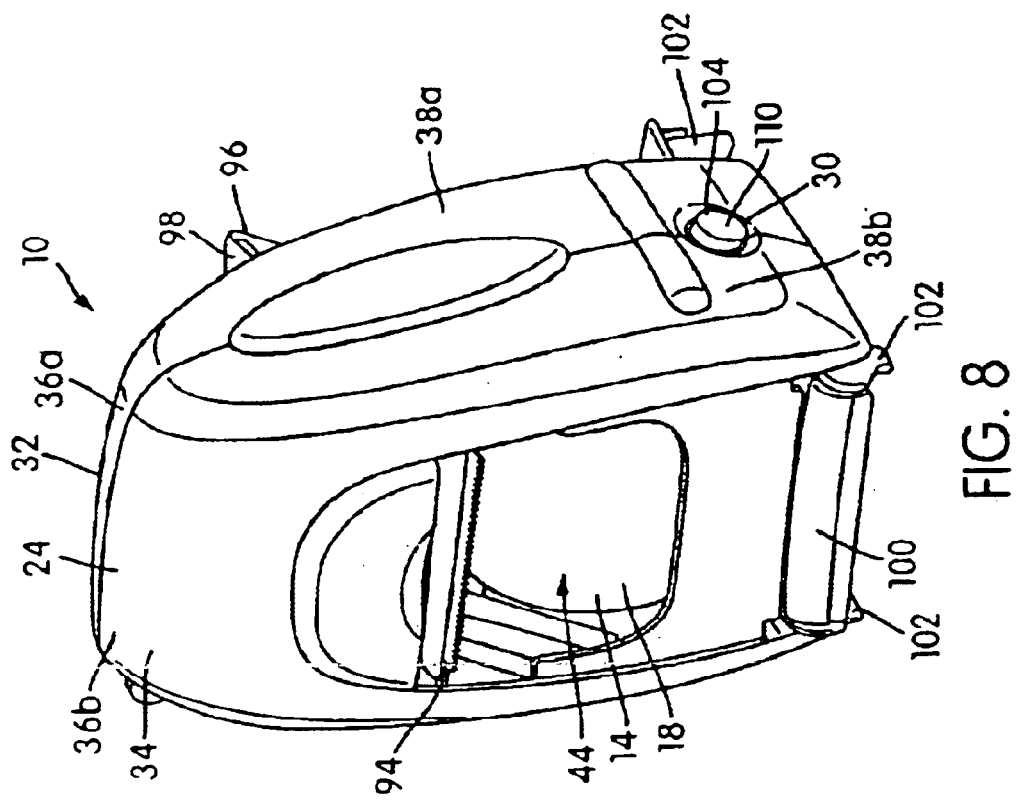
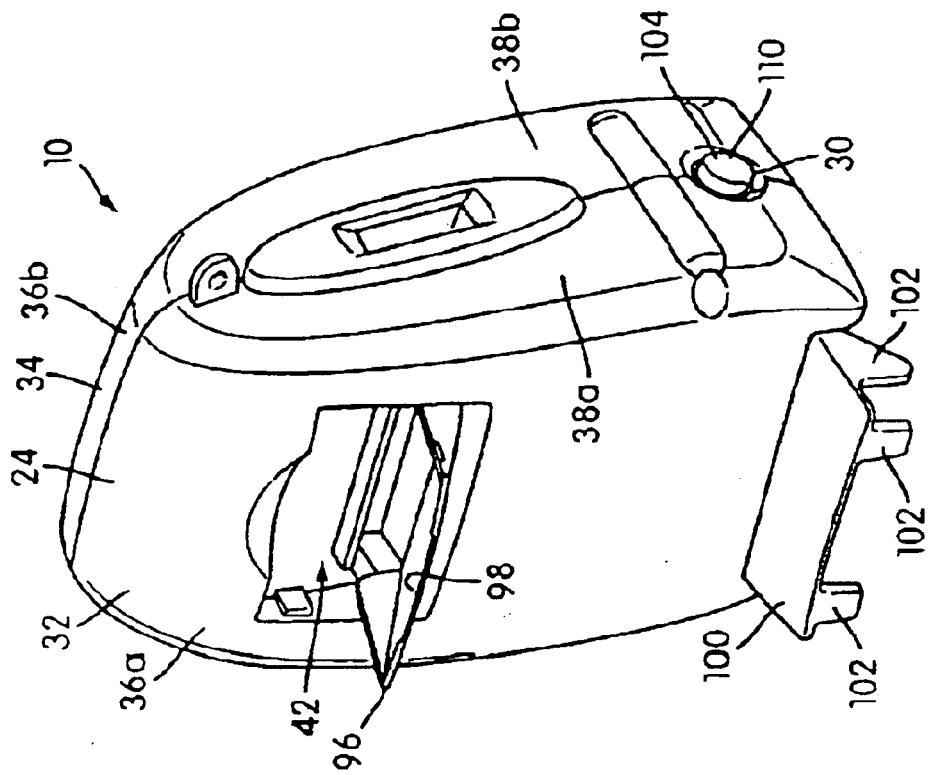

MASTER PROCESSING APPARATUS WITH EJECTOR MECHANISM

FIELD OF THE INVENTION

The present invention relates to a master processing apparatus for performing a master processing operation on a selected substrate.

BACKGROUND AND SUMMARY OF THE INVENTION

Master processing apparatuses, such as laminating apparatuses and adhesive transfer apparatuses, are well known in the art. These apparatuses typically include a frame to which a pair of feed rolls are removably mounted (either individually or in a cartridge). A master processing assembly is provided in the frame, and the stock materials on the feed roll are unwound and fed into the processing assembly. A power or hand operated actuator actuates the processing assembly. A master (such as a photograph, printout, business card, or any other selected substrate or document) to be processed is fed into the processing assembly and the processing assembly causes adhesive from one or both the stock materials to bond to the master. In laminating operations, both stock materials are laminating films coated with pressure sensitive or heat sensitive adhesive, and these films are both adhered to the opposing sides of the master. In adhesive transfer operations, one of the stock materials has a release liner on which a layer of adhesive is coated, and the other is an aggressive or non-aggressive mass. During the operation, the adhesive on the release liner is transferred to one side of the master and, if the mask substrate is aggressive (i.e., has an affinity for adhesive bonding), then any excess adhesive will transfer to the mass substrate, which is then peeled off to expose the master on the release liner and remove the excess adhesive. For further details on these operations, reference may be made to U.S. Pat. Nos. 5,580,417 and 5,584,962.

One aspect of the invention relates to a master processing apparatus having an ejector mechanism to facilitate the removal and replacement of a cartridge, to which the feed rolls are mounted, with respect to the frame thereof. This aspect of the invention provides a master processing system including a frame and a cartridge assembly having a cartridge body and first and second feed rolls rotatably mounted to the cartridge body. The first and second feed rolls carry respective supplies of first and second stock material with at least one of the stock materials having a layer of adhesive disposed thereon. The cartridge body is removably mounted to the frame. A master processing assembly is constructed and arranged such that a master can be inserted into the master processing assembly together with the stock materials unwound from their respective feed rolls and disposed on opposing sides of the master. The master processing assembly is constructed and arranged to perform a master processing operation, wherein the master processing assembly causes adhesive bonding between the master and the stock materials being fed therein. An ejector mechanism is constructed and arranged to eject the cartridge assembly in an outward direction with respect to the frame.

Another aspect of the invention relates to handheld master processing apparatuses, which can be easily stored in a backpack or scrapbook kit, for example. In normal size master processing apparatuses, it is conventional to provide a feed tray that extends outwardly from the frame of the apparatus and is positioned to support a master in a substantially flat condition as the master is fed into the master processing assembly. In a handheld apparatus, a feed tray can be problematic when the handheld apparatus is stored in a backpack or scrapbook kit. Specifically, the feed tray may be broken off or damaged when it is being stored.

To alleviate this problem, another aspect of the invention relates a handheld master processing apparatus having an input or feed tray pivotally connected to the frame thereof to enable the tray to be moved to an inoperative position to protect the tray from being damaged. This aspect of the invention provides a handheld master processing system including a frame of a size and configuration to be held in one hand of a user. The apparatus includes first and second feed rolls rotatably mounted within the frame. The feed rolls carry respective supplies of first and second stock material with at least one of the stock materials having a layer of adhesive disposed thereon. A master processing assembly is constructed and arranged such that a master can be inserted into the master processing assembly together with the stock materials unwound from their respective feed rolls and disposed on opposing sides of the master. The master processing assembly is constructed and arranged to perform a master processing operation, wherein the master processing assembly causes adhesive bonding between the master and the stock materials being fed into a feed side thereof. An input tray having a substrate supporting surface is pivotally connected to the frame adjacent a feed opening thereof. The input tray is selectively moveable between (a) an operative position in which the input tray extends outwardly from the frame and the substrate supporting surface thereof is positioned to support a master in a substantially flat condition as the master is being fed into the master processing assembly, and (b) an inoperative position in which the input tray is positioned in covering relation to the feed opening of the frame.

Other aspects, features and advantages of this invention will become apparent from the following detailed description when taken in conjunction with the accompanying drawings, which are part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 3 is a front view of the master processing apparatus of FIG. 1, the input tray thereof in an inoperative position;

FIG. 4 is a cross-sectional view taken along line 4—4 in FIG. 3;

FIG. 7 is a perspective view of master processing apparatus of FIG. 1 taken from a feed side thereof, the input tray thereof in an operative position;

FIG. 8 is a perspective view of the master processing apparatus of FIG. 1 taken from a discharge side thereof, the support structure thereof in an operative position;

DETAILED DESCRIPTION THE ILLUSTRATED EMBODIMENT

Figure 2:
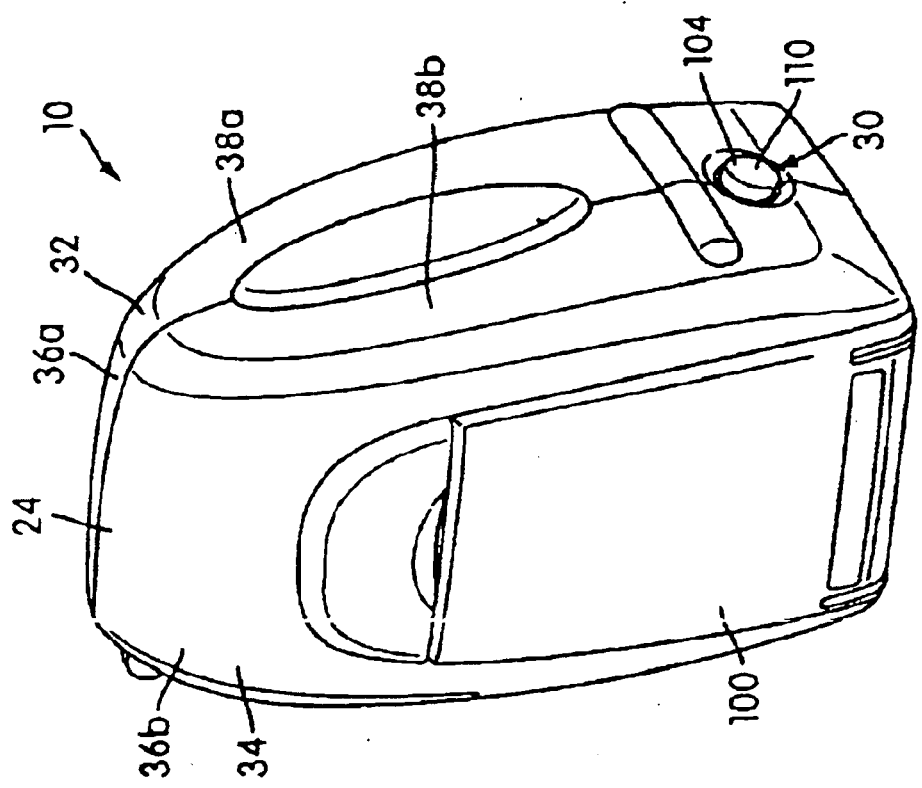
FIG. 2 is a perspective view of the master processing apparatus of FIG. 1 taken from a discharge side thereof, the support structure thereof in an inoperative position.
Figure 1:
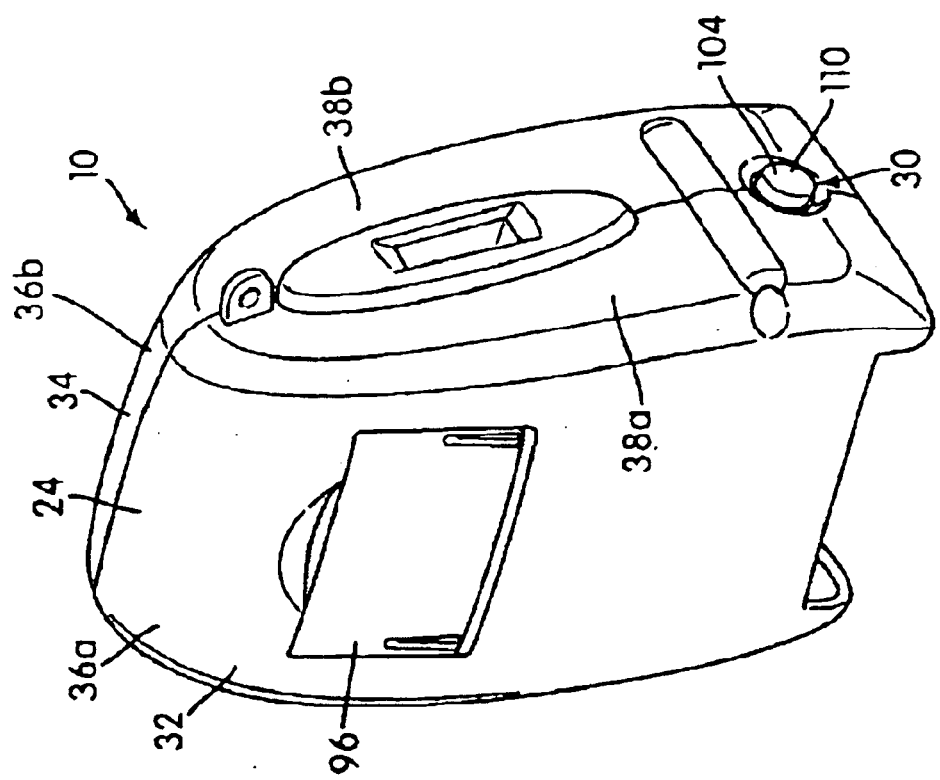
FIG. 1 is a perspective view of an embodiment of a master processing apparatus taken from a feed side thereof constructed in accordance with the principles of the present invention, the input tray thereof in an inoperative position.

FIGS. 1–10 show one embodiment of a master processing apparatus 10 for performing a master processing operation on a selected substrate. The selected substrate or master may be any type of substrate desired to be processed, including but not limited to photographs, business cards, label stock, price tags, magazine cutouts, name tags, etc. In the illustrated embodiment, the apparatus 10 is of a handheld size that can be manually grasped and conveniently handled in one hand. However, the apparatus 10 may be of any suitable size.

As explained below, the master processing apparatus 10 is constructed for use with a pair of removable feed rolls 12, 14, each of which carries a supply of stock material 16, 18 that is wound around a central core 20, 22 (see FIGS. 4, 6, and 10). The feed rolls 12, 14 and apparatus 10 can together be referred to as a master processing system. The stock materials 16, 18 can be, for example, a pair of transparent laminating films that are applied to opposing sides of the master to be protected. The stock materials 16, 18 may be designed for adhesive transfer with one of the stock materials being a release liner coated with a pressure-sensitive adhesive and the other stock material being an adhesive mask substrate (see U.S. Pat. Nos. 5,580,417 and 5,584,962 and U.S. application of Ensign, Jr., Ser. No. 09/564,587, filed May 5, 2000). Other variations of master processing operations may be performed with the apparatus 10. For example, the stock materials 16, 18 may include a magnetized substrate and an aggressive or non-aggressive adhesive mask (see U.S. application of Neuburger, Ser. No. 09/827, 943, filed Apr. 9, 2001). All the patents and patent applications mentioned hereinabove are hereby incorporated into the present application by reference. Regardless of the specific type of application, the apparatus 10 is operable to unwind the supply of stock material 16, 18 on each roll 12, 14 and apply the stock material 16, 18 to respective sides of the master. At least one of the stock materials 16, 18 has a layer of adhesive thereon which adheres the stock materials 16, 18 to one another and the master therebetween.

As shown in FIGS. 1–6, the apparatus 10 includes a frame 24; a cartridge assembly 26 including a first feed roll 12 and a second feed roll 14; a master processing assembly 28; and an ejector mechanism 30. In the illustrated embodiment, the frame 24 includes two frame halves 32, 34 constructed of plastic that are secured to one another to form a general wedge shape. Each frame half 32, 34 has an arcuate central wall 36a, 36b and inwardly facing side walls 38a, 38b, respectively. The inwardly facing side walls 38a, 38b of the frame halves 32, 34 are secured to one another with a snap-fit and/or fasteners, for example. As a result, the interior surfaces of the central walls 36a, 36b and side walls 38a, 38b cooperate to provide a cartridge receiving space 40. The bottom of the frame 24 is open to allow entry of the cartridge assembly 26 into the interior of the frame 24. The wedge-shaped frame 24 may be formed as a one piece structure. Further, the frame 24 may be made from any other suitable material, such as metal, for example. Moreover, the frame 24 may have any other suitable shape such as a rectangular shape, for example.

As shown in FIGS. 7–10, the frame 24 includes a feed opening 42 and an exit or discharge opening 44. In the illustrated embodiment, the feed opening 42 is provided on the frame half 32 and the discharge opening 44 is provided on the frame half 34. The selected master may be pushed through the feed opening 42 and between the feed rolls 12, 14 to emerge from the discharge opening 44 with stock materials 16, 18 affixed thereto. The stock materials 16, 18 are provided by the feed rolls 12, 14. While the selected master is disposed between the feed rolls 12, 14, the pressing force provided by the master processing assembly 28 acts thereon and on the stock materials 16, 18 to affect the desired processing operation, as will be described in greater detail below.

Figure 12:
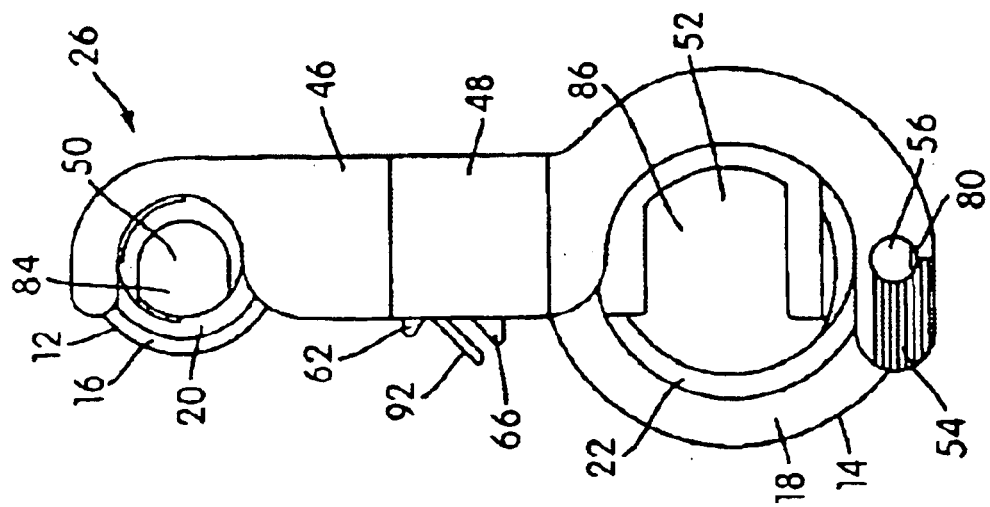
FIG. 12 is a side view of the cartridge assembly of FIG. 11
Figure 11:
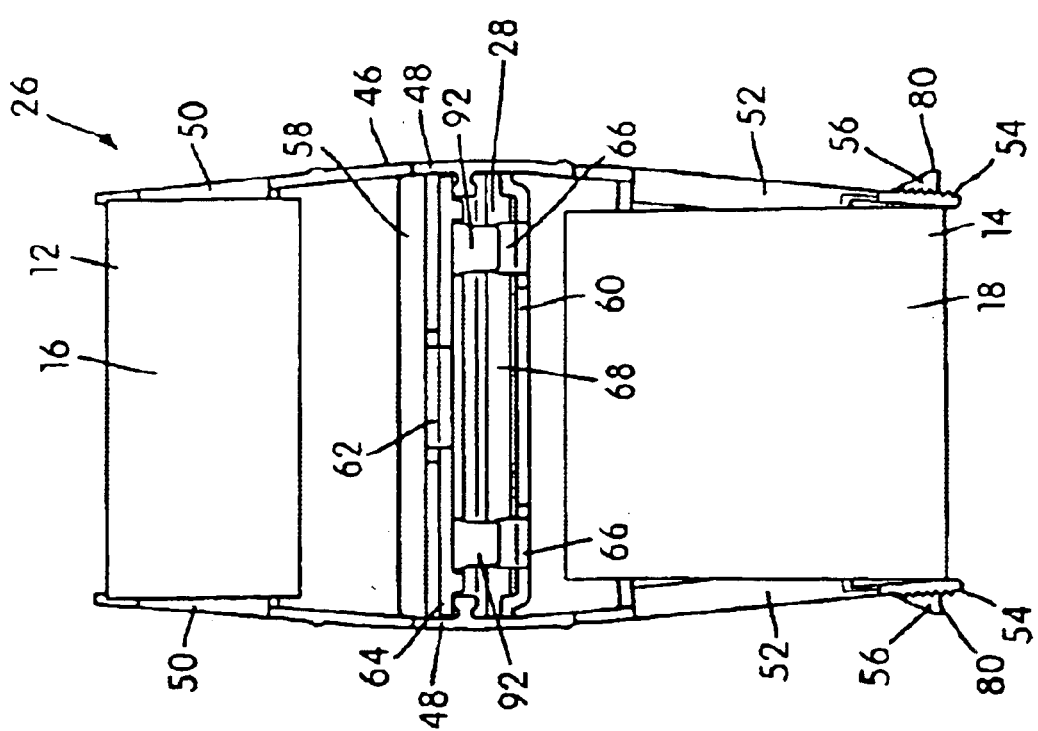
FIG. 11 is a front view of a cartridge assembly that is mountable within the frame of the master processing apparatus.

In the illustrated embodiment, the feed rolls 12, 14 are mounted within the cartridge assembly 26 to facilitate easy removal and replacement of the feed rolls 12, 14. The cartridge assembly 26 includes a cartridge body 46 constructed and arranged to be removably mounted within the cartridge receiving space 40 of the frame 24 and to the pair of feed rolls 12, 14 rotatably mounted therein. In the illustrated embodiment, the cartridge body 46 is constructed from a sufficiently resilient material, such as plastic. The cartridge body 46 may be of a one-piece construction. As shown in FIGS. 6, 11, and 12, the cartridge body 46 of the cartridge assembly 26 includes cooperating side walls 48 that define a pair of first feed roll supports 50 and a pair of second feed roll supports 52, respectively. The first feed roll supports 50 have a generally circular configuration and are positioned on opposite sides of the first feed roll 12 to releasably receive the first feed roll 12 therebetween. The second feed roll supports 52 have a generally circular configuration and are positioned on opposite sides of the second feed roll 14 to rotatably receive the second feed roll 14 therebetween.

As shown in FIGS. 11 and 12, the second supports 52 each have a manually engagable portion 54 provided on a free end thereof. The engagable portion 54 may be ribbed or otherwise textured for better gripping. An outwardly extending tab 56 is also provided on the free ends of the second supports 52 adjacent the manually engagable portions 54. The tabs 56 are configured to engage within recesses provided on the side walls 38 of the frame 24 to releasably secure the cartridge assembly 26 within the frame 24, as will be further discussed.

The cartridge assembly 26 also supports the master processing assembly 28. Specifically, as shown in FIGS. 4, 6, and 10–12, the cartridge assembly 26 includes an upper member 58 and a lower member 60 that extend between the side walls 48 to space the side walls 48 from one another. The upper member 58 has a flange 62 extending therefrom which is configured to secure an upper portion 64 of the master processing assembly 28 adjacent the upper member 58. The lower member 60 has a pair of flanges 66 extending therefrom which are configured to secure a lower portion 68 of the master processing assembly 28 adjacent the lower member 60.

Figures 9, 10:
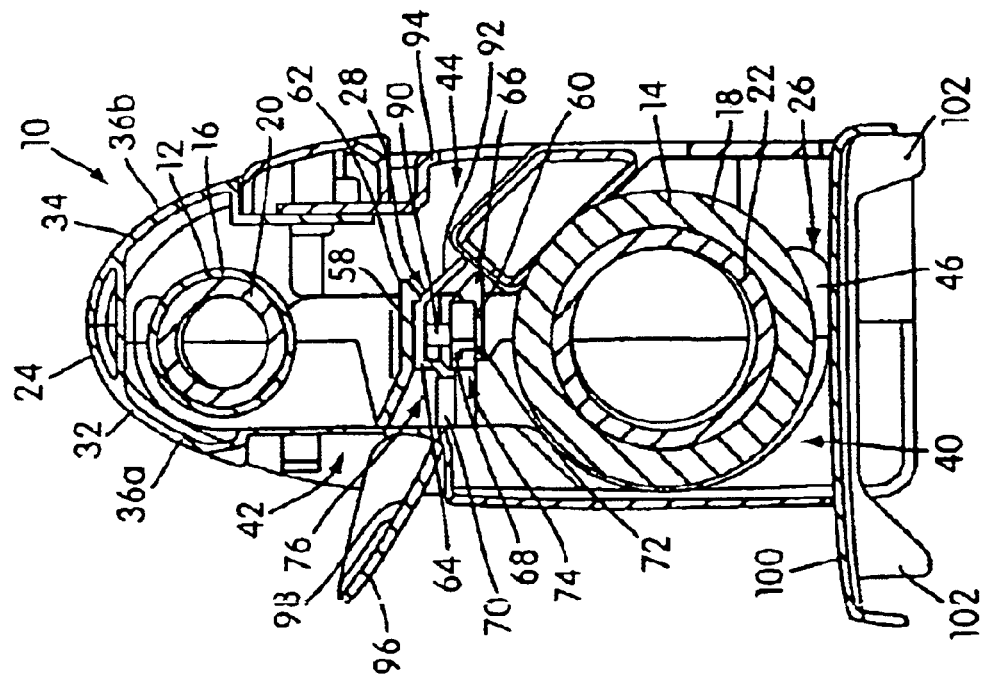
FIG. 9 is a front view of the master processing apparatus of FIG. 1, the input tray thereof in an operative position.
FIG. 10 is a cross-sectional view taken along line 10—10 in FIG. 9.

As shown in FIGS. 4 and 10, the upper member 58 is angled upwardly toward the feed opening 42, and is configured to receive the stock material 16 of the first feed roll 12 as the stock material 16 is fed over its uppermost surface. The lower member 60 has an upper ribbed portion 70 and a lower portion 72 that is spaced from the upper portion 70 to define an opening 74 therebetween. The opening 74 receives the stock material 18 of the second feed roll 14 therethrough. The upper portion 70 of the lower member 60 is spaced from the upper member 58 so as to define a substrate receiving slot 76, which receives the master when the master is manually fed through the feed opening 42.

The feed rolls 12, 14 each carry a supply of stock material 16, 18 and are mounted to the cartridge assembly 26 to enable the stock materials 16, 18 to be unwound from their respective feed rolls 12, 14 and placed between the master processing assembly 28. Each roll of stock material or substrate 16, 18 is comprised of a long, continuous strip of stock material wound around a central tubular core 20, 22. Typically the core 20, 22 is made of cardboard. The cores 20, 22 of the feed rolls 12, 14 are rotatably mounted to the feed roll supports 50, 52 of the cartridge assembly 26. The cartridge assembly 26 and the feed rolls 12, 14 are constructed and arranged such that when the cartridge assembly 26 is removably mounted to the frame 24, a master can be inserted into the slot 76 of the cartridge assembly 26 and passed therethrough into the master processing assembly 28 with the stock materials 16, 19 from respective feed rolls 12, 14 then disposed on opposing sides of the master.

The bottom of the frame 24 is open to allow entry of the cartridge assembly 26 into the interior of the frame 24. Thus, the cartridge assembly 26 may be loaded into the frame 24 by forcing the cartridge assembly 26 upwardly into the downwardly facing opening in the frame 24. However, because the apparatus 10 is handheld, the frame 24 may be maneuvered so as to position the opening in any orientation. For example, the opening may be oriented such that it faces generally upwardly and the cartridge assembly 26 may be dropped vertically downwardly into the frame 24.

Figure 6:
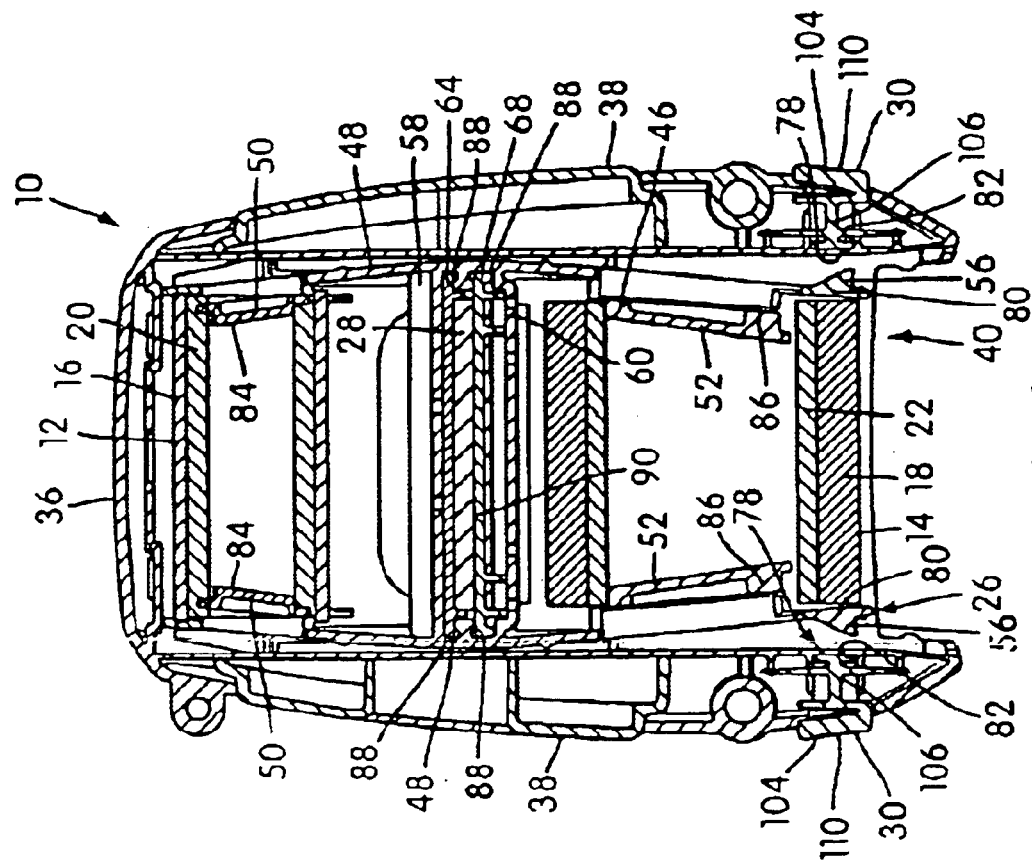
FIG. 6 is a cross-sectional view taken along line 6—6 in FIG. 5.
Figure 14:
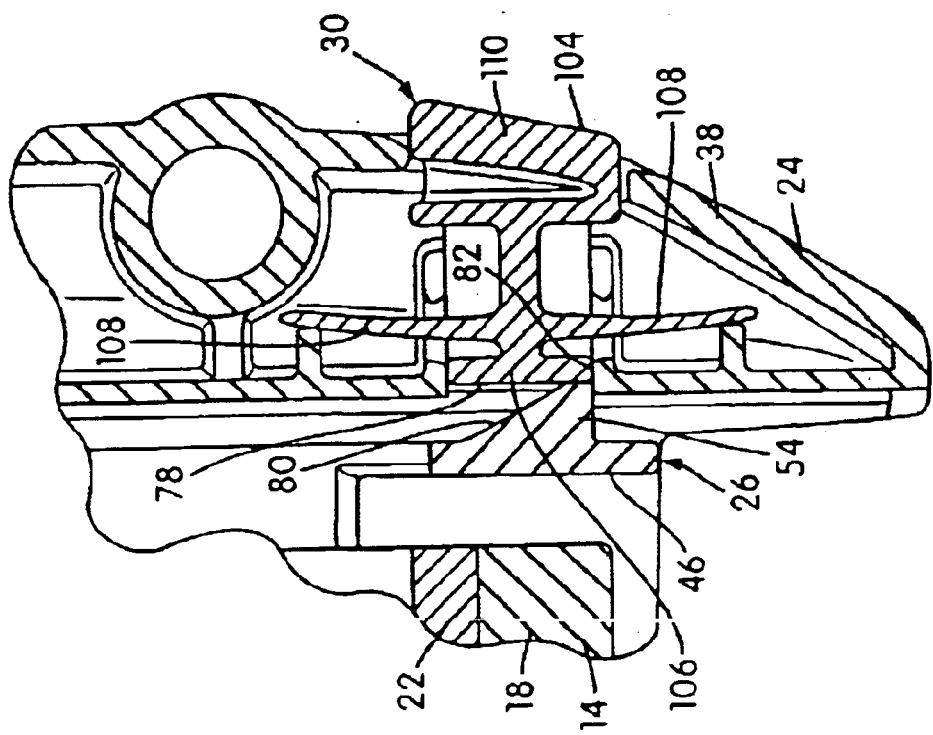
FIG. 14 is an enlarged cross-sectional view of the ejector mechanism of FIG. 13 in an inoperative position.

As shown in FIGS. 6 and 14, the frame 24 provides a first lock structure 78 and the cartridge assembly 26 provides a second lock structure 80 such that the cartridge assembly 26 is mountable to the frame 24 with the first and second lock structures 78, 80 engaging with one another to releasably secure the cartridge assembly 26 to the frame 24. In the illustrated embodiment, the first lock structure 78 is a pair of recesses 82 provided on the side walls 38 of the frame 24. The second lock structure 80 is a pair of outwardly extending tabs 56 provided on the free ends of the second supports 52 of the cartridge assembly 26. However, the recesses and tabs may be of any construction that cooperate to secure the cartridge assembly 26 to the frame 24.

The side walls 48 of the cartridge assembly 26 are constructed such that a user may insert the cartridge assembly 26 into the opening in the bottom of the frame 24 by manually pressing the engagable portions 54 on the free ends towards one another, by squeezing the engagable portions 54 together, for example, so that the user may insert the cartridge assembly 26 between the side walls 38 of the frame 24. When the engagable portions 54 on the free ends are released as the cartridge assembly 26 reaches an operative position, the cooperating side walls 48 of the cartridge assembly 26 are sufficiently resilient to deflect away from one another such that the free ends move away from one another and into their initial position. As a result, the tabs 56 on the free ends of the first and second supports 50, 52 engage within the recesses 82 provided in the side walls 38 of the frame 24 to releasably secure the cartridge assembly 26 to the frame 24. Specifically, the tabs 56 are resiliently deflected outwardly by the side walls 38 of the frame 24 until the cartridge assembly 26 reaches the operative position in which the tabs 56 move into the recesses 82 of the frame 24 to lock and retain the cartridge assembly 26 in the operative position.

As shown in FIG. 6, the first feed roll supports 50 of the cartridge assembly 26 are received inside the frame 24 adjacent the upper portion of the frame 24. Each of the supports 50 has a circular plate structure 84, respectively, and the opposing ends of the core 20 are positioned over the circular plate structures 84 to hold and support the first feed roll 12 therebetween. The second feed roll supports 52 are received within the frame 24 adjacent the lower portion of the frame 24. Each of the supports 52 has a circular plate structure 86, respectively, and the opposing ends of the core 22 are positioned over these circular plate structures 86 to hold and support the second feed roll 14 therebetween.

The master processing assembly 28 is configured to press the stock materials 16, 18 of the feed rolls 12, 14 into engagement with one another, in a generally vertical pressing direction, in a manner similar to conventional nip rollers. In the illustrated embodiment, the pressing direction is generally vertical, however it is contemplated that the pressing direction may be other than vertical. The master processing assembly 28 includes the spaced apart upper and lower portions 64, 68, respectively, which are positioned to receive the stock materials 16, 18 therethrough. As best seen in FIG. 6, grooves 88 are formed in the side walls 48 of the cartridge assembly 26. The grooves 88 are configured to receive the upper and lower portions 64, 68 of the master processing assembly 28 in desired space relation and the upper and lower portions 64, 68 are secured in the cartridge assembly 26 by the flanges 62, 66 provided on the upper and lower members 58, 60, respectively. The upper and lower portions 64, 66 are configured to keep the stock materials 16, 18 pressed together as the diameters of the feed rolls 12, 14 are reduced due to the depletion of the stock materials 16, 18.

The upper portion 64 of the master processing assembly 28 is in the form of an elongated clip that has a plurality of longitudinally extending slots formed therein. The slots are configured to receive weather stripping 90 therethrough so as to keep the stock materials 16, 18 pressed together. A pair of spaced, deflecting members 92 are provided on the upper portion 64 to direct the master downwardly away from a cutting blade 94 disposed in the discharge opening 44. This allows the user to grab and manually pull the free ends of the stock materials 16, 18 extending out of the discharge opening 44. The cutting blade 94 is operable to sever a final product containing a master from the continuous strips of stock material 16, 18. The cutting blade 94 may be a serrated blade, a non-serrated blade or any other type of blade. The lower portion 68 of the master processing assembly 28 is in the form of an elongated clip that has a smooth upper surface that cooperates with the weather stripping 90 on the upper portion 64 to keep the stock materials 16, 18 pressed together.

The selected master is inserted into the feed opening 42, and then the lead end thereof can be fed between the feed rolls 12, 14. The user then manually advances the selected master between the feed rolls 12, 14 so that the pressed engagement of the master processing assembly 28 presses the stock materials 16, 18 against the opposing sides of the selected master so as to effect adhesive bonding between the master and stock materials 16, 18. As the selected master is advanced between the feed rolls 12, 14, the stock materials 16, 18 unwind from their respective feed rolls 12, 14 and advance together with the selected master out through the discharge opening 44. In the illustrated embodiment, advancement of the selected master may be affected by manually pulling on the free ends of the stock materials 16, 18 extending out the discharge opening 44. Alternatively, an actuator may be provided to advance the master through the master processing assembly 28.

An input or feed tray 96 having a substrate supporting surface 98 is pivotally connected to the frame 24 adjacent the feed opening 42 for selective movement between an operative position (as shown in FIGS. 7–10) and an inoperative position (as shown in FIGS. 1, 3–5). When the tray 96 is in its operative position, it extends outwardly from the frame 24 and the substrate supporting surface 98 on the tray 96 is positioned to support a master in a substantially flat condition as the master is being fed into the master processing assembly 28. When the tray 96 is in its inoperative position, it is positioned in covering relation to the feed opening 42 of the frame 24 to inhibit ingress of undesired objects into the master processing assembly 28 via the feed opening 42. In the illustrated embodiment, the tray 96 is maintained in the inoperative position with a snap-fit.

Figure 5:
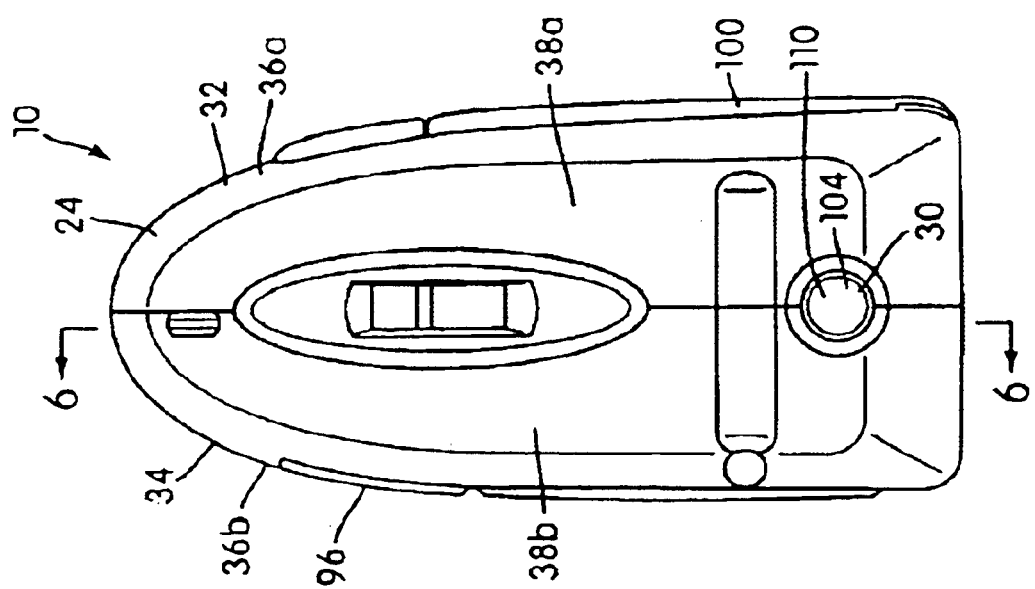
FIG. 5 is a side view of the master processing apparatus of FIG. 1, the input tray and support structure thereof in an inoperative position.

A support structure 100 is pivotally connected to the frame 24 adjacent the discharge opening 44 for selective movement between an operative position (as shown in FIGS. 7–10) and an inoperative position (as shown in FIGS. 2, 4, and 5). When the support structure 100 is pivoted to its operative position, it extends generally perpendicular to the frame 24 so as to rigidly support the apparatus 10 in an upright position. Specifically, the support structure 100 is capable of maintaining the frame 24 in a generally perpendicular relation relative to a horizontal surface when the apparatus 10 is placed on such horizontal surface. The support structure 100 includes a plurality of support members or feet 102 along the edges thereof that engage the horizontal surface. When the support structure 100 is in its inoperative position, it is positioned in covering relation to the discharge opening 44 of the frame 24 to inhibit ingress of undesired objects into the master processing assembly 28 via the discharge opening 44. In the illustrated embodiment, the support structure 100 is maintained in the inoperative position with a snap-fit.

The movable mounting of the input tray 96 and support structure 100 into the inoperative position is advantageous because it protects the processing assembly 28 and supply rolls 12, 14 and also makes the apparatus 10 more compact for storage purposes. In the illustrated embodiment, the apparatus 10 is handheld such that it may be compact enough to store in a backpack or pocket. Moreover, the movable mounting of the input tray 96 and support structure 100 into the inoperative position protects the input tray 96 and support structure 100 from being damaged.

Figure 13:
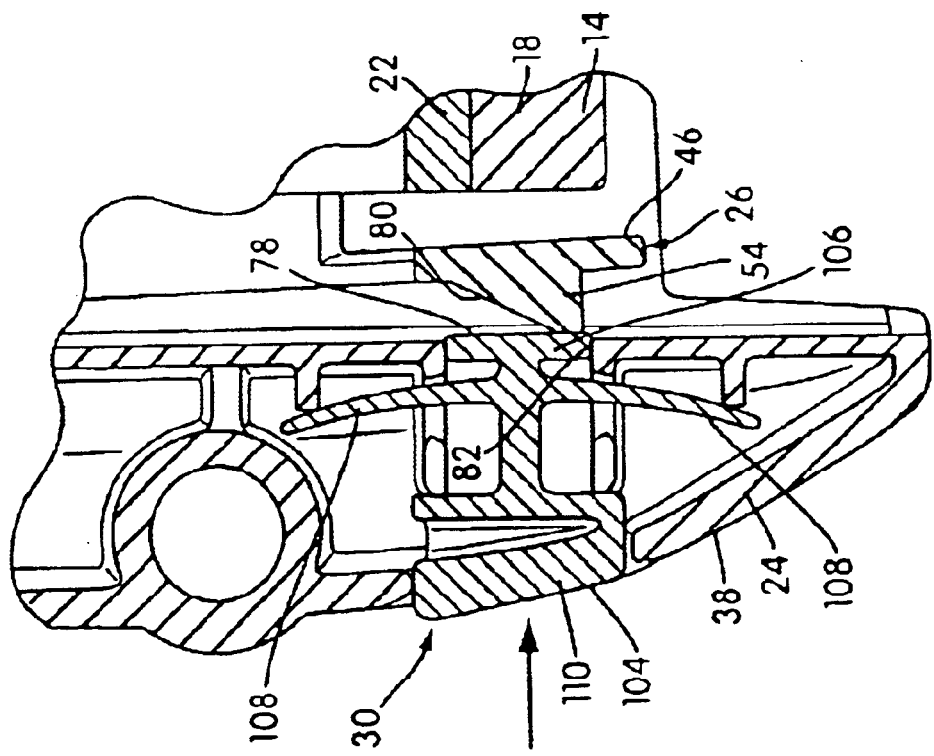
FIG. 13 is an enlarged cross-sectional view of an ejector mechanism of the master processing apparatus in an operative position.

The ejector mechanism 30 is operable to release the cartridge assembly 26 from the frame 24. Specifically, the ejector mechanism 30 includes a pair of pusher members 104 that are slidably mounted within the pair of recesses 82 on the side walls 38 of the frame 24. As shown in FIGS. 13 and 14, each pusher member 104 includes a tab engaging member 106, resilient arm members 108, and a manually engagable actuator 110. The tab engaging member 106 is positioned adjacent the interior surface of the frame 24. The resilient arm members 108 extend outwardly from the tab engaging member 106 and are positioned on platforms provided within the interior of the side walls 38. The manually engagable actuator 110 extends outwardly from the frame 24 to permit easy access by the user (e.g., finger operation).

The ejector mechanism 30 is movable between an operative position (as shown in FIG. 13) and an inoperative position (as shown in FIG. 14). In the inoperative position, the resilient arm members 108 are in a free state which positions the tab engaging member 106 sufficiently within the respective recess 82 away from the interior surface of the side walls 38. Further, the actuator 110 extends sufficiently outwardly from the frame 24. As a result, when a cartridge assembly 26 is mounted within the frame 24, the tabs 56 on the free ends of the first and second supports 50, 52 are allowed to move into the recesses 82 of the frame 24 to lock and releasably secure the cartridge assembly 26 in the operative position. When the ejector mechanism 30 is moved to the operative position, by manually pushing in on the actuators 110 that extend outwardly from the frame 24, the tab engaging members 106 are moved inwardly against biasing from the resilient arm members 108 to apply a force to the tabs 56 that pushes the tabs 56 from the recesses 82 in the frame 24 so as to release the cartridge assembly 26 from the frame 24. With the tabs 56 removed from within the recesses 82 in the frame 24, gravity urges the cartridge assembly 24 out the downwardly facing opening in the frame 24. When the actuators 110 are released, the resilient arm members 108 bias the tab engaging member 106 and actuators back into the inoperative position.

Figure 15:
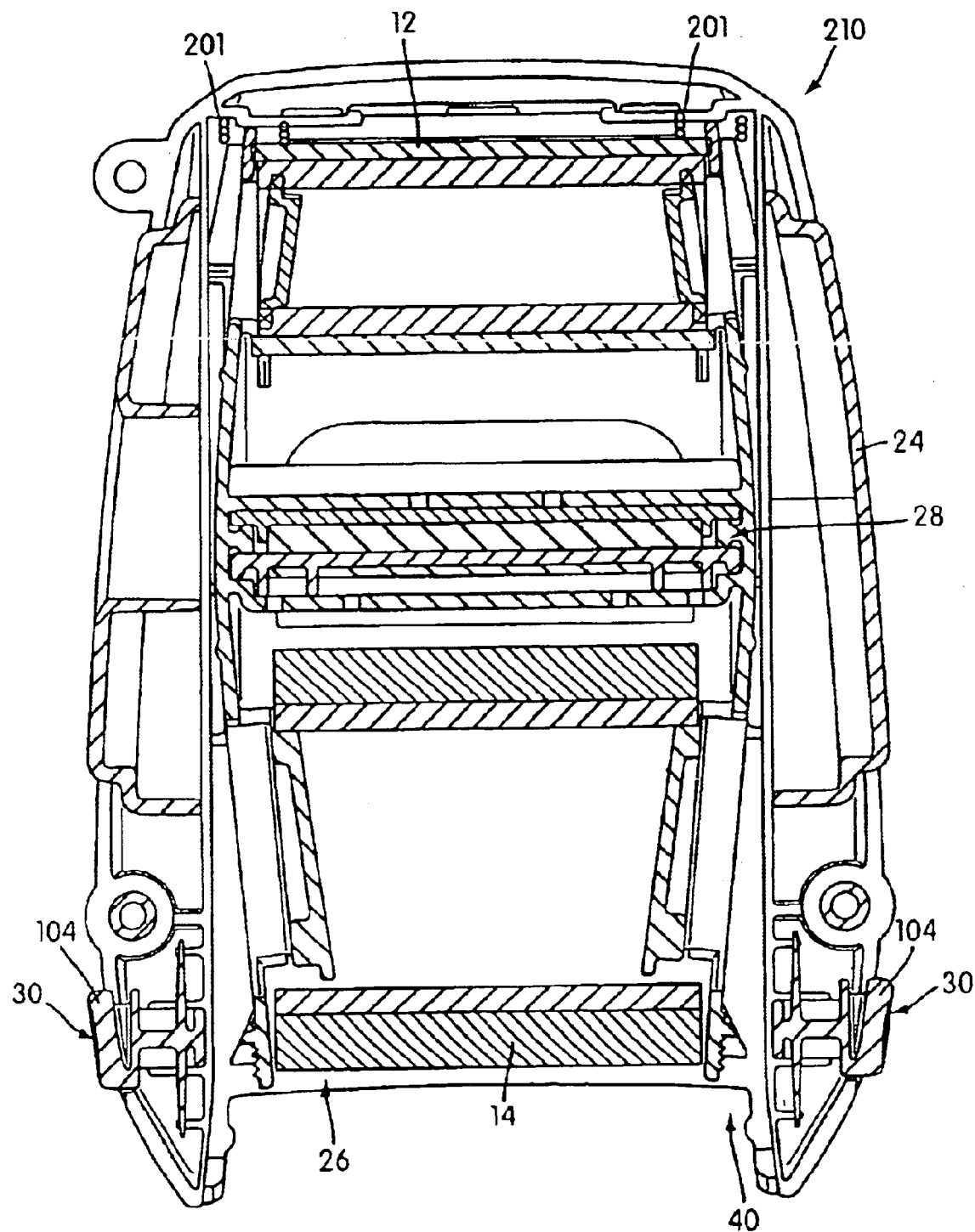
FIG. 15 is a cross-sectional view of another embodiment of a master processing apparatus with the cartridge assembly mounted within the frame thereof.
Figure 16:
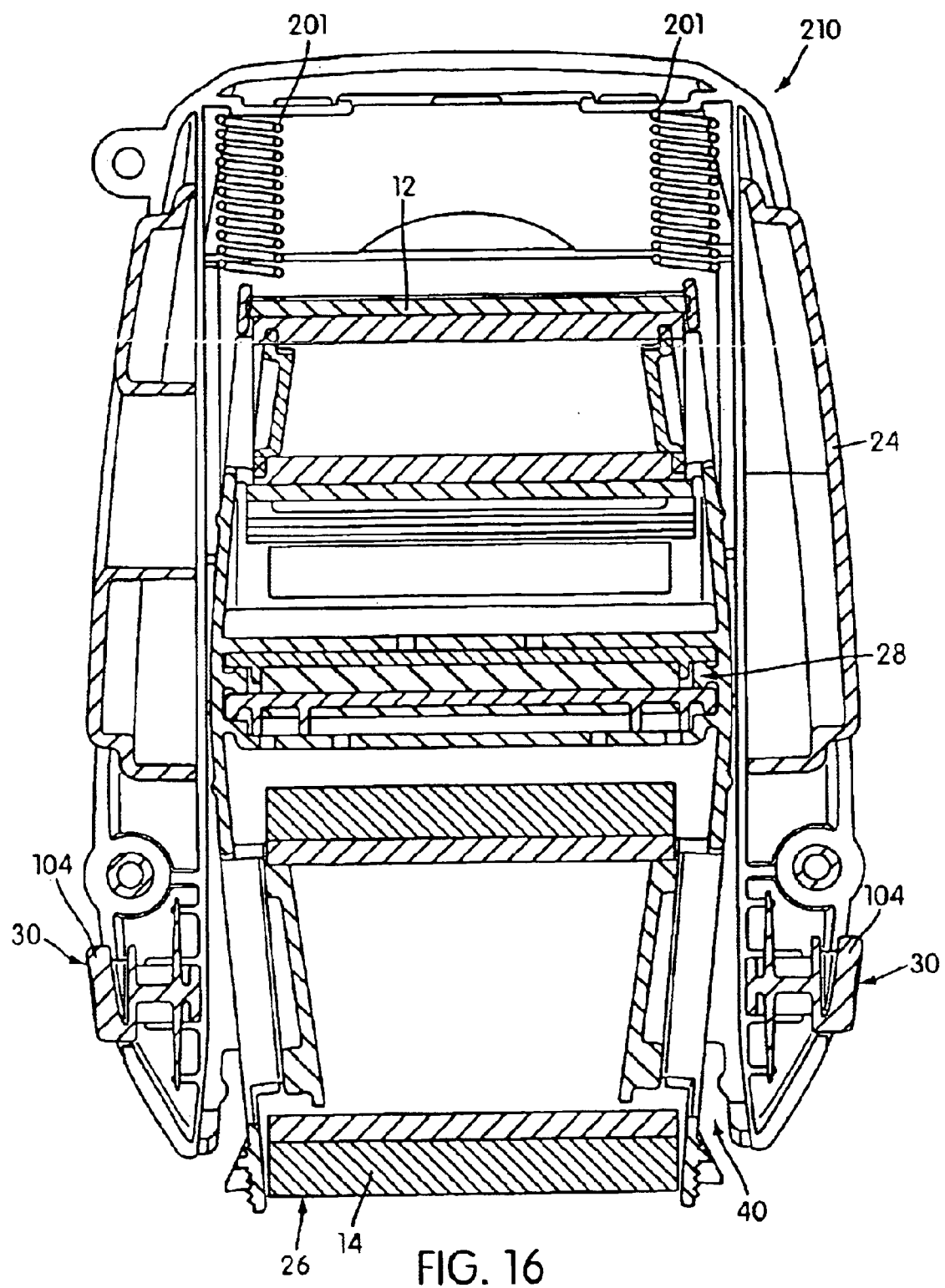
FIG. 16 is a cross-sectional view of the master processing apparatus of FIG. 15 with the cartridge assembly ejected from the frame thereof.

Alternatively, the ejector mechanism 30 may include a biasing structure, such as a spring, to urge or eject the cartridge assembly 26 in an outward direction with respect to the frame 24. Specifically, FIGS. 15 and 16 show a master processing apparatus 210 that includes a pair of springs 201 mounted to an upper portion of the frame 24 within the cartridge receiving space 40. The springs 201 may be molded plastic springs that form a part of the frame 24 or the springs 201 may be formed separately from the frame 24 and mounted thereto. When the cartridge assembly 26 is mounted within the frame 24, the springs 201 are compressed between the cartridge assembly 26 and upper portion of the frame 24, as shown in FIG. 15. When the cartridge assembly 26 is released from the frame 24 by the pusher members 104, the springs 201 eject or urge the cartridge assembly 26 outwardly from the frame, as shown in FIG. 16. The biasing structure may also be mounted on the cartridge instead of the frame.

The ejector mechanism 30 should not be limited to handheld apparatuses. The ejection mechanism concept may also be applied to any cartridge based system including heat operated systems, and systems wherein the master processing assembly is on the frame instead of the cartridge assembly. For example, the ejector mechanism concept may be applied to full sized cartridge based master processing apparatuses such as, for example, those disclosed in U.S. Pat. Nos. 6,270,612, 6,244,312, and 5,788,806, and U.S. patent application Ser. Nos. 09/564,587, 09/691,042, 09/966,012, 09/987,484, and 60/306,432. All of these patents and patent applications are incorporated herein by reference. Moreover, it is contemplated that other suitable structures besides the above-described ejector mechanism, such as levers or spring-loaded devices, may be employed to eject the cartridge assembly from the frame. For example, the ejector mechanism could be electrically powered and possibly a solenoid could be used.

In the illustrated embodiment, to perform a master processing operation, a cartridge assembly 26 is placed inside the frame 24. The cartridge assembly 26 is structured such that the leading portions of the stock materials 16, 18 from the feed rolls 12, 14, respectively, are unwound and placed between the upper and lower portions 64, 68 of the master processing assembly 28. A document or other master to be covered with stock material is placed on the substrate support surface 98 of the feed tray 96 and pushed through the feed opening 42 in the frame 24 and through the substrate receiving slot 76 in the cartridge assembly 26 until the master comes into contact with the unwound portions of the stock materials 16, 18. At least one of the unwound portions is coated with an adhesive so that the master adheres thereto. The operator then manually pulls on the free ends of the stock materials 16, 18 extending out the discharge opening 44 to advance the master through the master processing assembly 28. As the stock materials (with or without the master therebetween) pass between the upper and lower portions 64, 68 of the master processing assembly 28, the upper and lower portions 64, 68 apply pressure to the stock materials 16, 18 to activate the pressure sensitive adhesive and adhere the stock materials 16, 18 to opposing sides of the master and/or to one another. When the entire length of the master has been covered with stock material 16, 18, the final product passes through the discharge opening 44. When the master has cleared the discharge opening 44, the operator stops pulling of the free ends of the stock materials 16, 18 and uses the blade 94 of the to sever the finished product from the continuous strip of stock materials 16, 18.

It can thus be appreciated that the objectives of the present invention has been fully and effectively accomplished. The foregoing specific embodiments have been provided to illustrate the structural and functional principles of the present invention, and are not intended to be limiting. To the contrary, the present invention is intended to encompass all modifications, alterations and substitutions within the spirit and scope of the appended claims.

What is claimed is:

1. A master processing system comprising:
   a frame;
   a cartridge assembly comprising a cartridge body and first and second feed rolls rotatably mounted to the cartridge body, the first and second feed rolls carrying respective supplies of first and second stock material, at least one of the stock materials having a layer of adhesive disposed thereon, the cartridge body being removably mounted to the frame;
   a master processing assembly constructed and arranged such that a master can be inserted into the master processing assembly together with the stock materials unwound from their respective feed rolls and disposed on opposing sides of the master;
   the master processing assembly being constructed and arranged to perform a master processing operation, wherein the master processing assembly causes adhesive bonding between the master and the stock materials being fed therein; and
   an ejector mechanism constructed and arranged to eject the cartridge assembly in an outward direction with respect to the frame.

2. A master processing system according to claim 1, wherein the frame is of a size suitable to be held in one hand of a user.

3. A master processing system according to claim 1, wherein the frame provides a first lock structure and the cartridge body provides a second lock structure, the first and second lock structures engaging with one another to releasably secure the cartridge assembly to the frame.

4. A master processing system according to claim 3, wherein the first lock structure is a pair of recesses provided on side walls of the frame and the second lock structure is a pair of tabs provided on the cartridge body, the tabs engaging within the recesses to releasably secure the cartridge assembly to the frame.

5. A master processing system according to claim 4, wherein the ejector mechanism includes a pair of pusher members that are slidably mounted within the pair of recesses on the side walls of the frame, the ejector mechanism being movable between (a) an inoperative position in which the pusher members are positioned within the recesses to allow the tabs of the cartridge assembly to move into the recesses of the frame to lock and releasably secure the cartridge assembly within the frame, and (b) an operative position in which the pusher members are moved into engagement with the tabs of the cartridge assembly to apply a force to the tabs that pushes the tabs from the recesses to eject the cartridge assembly from the frame.

6. A master processing system according to claim 5, wherein the ejector mechanism includes resilient arm members that bias the pusher members into the inoperative position.

7. A master processing system according to claim 5, wherein the pusher members are manually moved between the inoperative and operative positions.

8. A master processing system according to claim 5, wherein the pusher members are positioned on an exterior portion of the frame.

9. A master processing system according to claim 1, wherein the cartridge body includes a pair of first feed roll supports to receive the first feed roll therebetween and a pair of second feed roll supports to receive the second feed roll therebetween.

10. A master processing system according to claim 1, wherein the cartridge body includes a manually engagable portion on a free end thereof to facilitate insertion of the cartridge assembly into the frame.

11. A master processing system according to claim 1, wherein the master processing assembly is provided on the cartridge assembly.

12. A master processing system according to claim 1, wherein the master processing assembly includes upper and lower portions configured to press the master and stock materials into engagement with one another as the master and stock materials are fed therebetween.

13. A master processing system according to claim 1, further comprising a cutting blade at a discharge opening thereof that is operable to sever a final product containing a master from the stock materials.

14. A master processing system according to claim 1, further comprising an input tray having a substrate supporting surface pivotally connected to the frame adjacent a feed opening thereof, the input tray selectively moveable between (a) an operative position in which the input tray extends outwardly from the frame and the substrate supporting surface thereof is positioned to support a master in a substantially flat condition as the master is being fed into the master processing assembly, and (b) an inoperative position in which the input tray is positioned in covering relation to the feed opening of the frame.

15. A master processing system according to claim 1, further comprising a support structure pivotally connected to the frame adjacent a discharge opening thereof, the support structure selectively movable between (a) an operative position in which the support structure extends generally perpendicular to the frame so as to rigidly support the apparatus in an upright position, and (b) an inoperative position in which the support structure is positioned in covering relation to the discharge opening of the frame.

16. A master processing system according to claim 15, wherein the support structure includes a plurality of support members along outer edges thereof that engage a surface when the apparatus is placed on such surface.

17. A handheld master processing system comprising:
a frame of a size and configuration to be held in one hand of a user;
first and second feed rolls rotatably mounted within the frame, the feed rolls carrying respective supplies of first and second stock material, at least one of the stock materials having a layer of adhesive disposed thereon;
a master processing assembly constructed and arranged such that a master can be inserted into the master processing assembly together with the stock materials unwound from their respective feed rolls and disposed on opposing sides of the master;
the master processing assembly being constructed and arranged to perform a master processing operation, wherein the master processing assembly causes adhesive bonding between the master and the stock materials being fed into a feed side thereof; and
an input tray having a substrate supporting surface pivotally connected to the frame adjacent a feed opening thereof, the input tray selectively moveable between (a) an operative position in which the input tray extends outwardly from the frame and the substrate supporting surface thereof is positioned to support a master in a substantially flat condition as the master is being fed into the master processing assembly, and (b) an inoperative position in which the input tray is positioned in covering relation to the feed opening of the frame.

18. A handheld master processing system according to claim 17, further comprising a cartridge assembly including a cartridge body to rotatably mount the feed rolls, the cartridge assembly being removably mounted to the frame.

19. A handheld master processing system according to claim 18, further comprising an ejector mechanism constructed and arranged to eject the cartridge assembly in an outward direction with respect to the frame.

20. A handheld master processing system according to claim 18, wherein the frame provides a first lock structure and the cartridge body provides a second lock structure, the first and second lock structures engaging with one another to releasably secure the cartridge assembly to the frame.

21. A handheld master processing system according to claim 20, wherein the first lock structure is a pair of recesses provided on side walls of the frame and the second lock structure is a pair of tabs provided on the cartridge body, the tabs engaging within the recesses to releasably secure the cartridge assembly to the frame.

22. A handheld master processing system according to claim 19, wherein the ejector mechanism includes a pair of pusher members that are slidably mounted within the pair of recesses on the side walls of the frame, the ejector mechanism being movable between (a) an inoperative position in which the pusher members are positioned within the recesses to allow the tabs of the cartridge assembly to move into the recesses of the frame to lock and releasably secure the cartridge assembly within the frame, and (b) an operative position in which the pusher members are moved into engagement with the tabs of the cartridge assembly to apply a force to the tabs that pushes the tabs from the recesses to eject the cartridge assembly from the frame.

23. A handheld master processing system according to claim 22, wherein the ejector mechanism includes resilient arm members that bias the pusher members into the inoperative position.

24. A handheld master processing system according to claim 22, wherein the pusher members are manually moved between the inoperative and operative positions.

25. A handheld master processing system according to claim 22, wherein the pusher members are positioned on an exterior portion of the frame.

26. A handheld master processing system according to claim 18, wherein the cartridge body includes a pair of first feed roll supports to receive the first feed roll therebetween and a pair of second feed roll supports to receive the second feed roll therebetween.

27. A handheld master processing system according to claim 18, wherein the cartridge body includes a manually engagable portion on a free end thereof to facilitate insertion of the cartridge assembly into the frame.

28. A handheld master processing system according to claim 18, wherein the master processing assembly is provided on the cartridge assembly.

29. A handheld master processing system according to claim 17, wherein the master processing assembly includes upper and lower portions configured to press the master and stock materials into engagement with one another as the master and stock materials are fed therebetween.

30. A handheld master processing system according to claim 17, further comprising a cutting blade at a discharge opening thereof that is operable to sever a final product containing a master from the stock materials.

31. A handheld master processing system according to claim 17, further comprising a support structure pivotally connected to the frame adjacent a discharge opening thereof, the support structure selectively movable between (a) an operative position in which the support structure extends generally perpendicular to the frame so as to rigidly support the apparatus in an upright position, and (b) an inoperative position in which the support structure is positioned in covering relation to the discharge opening of the frame.

32. A handheld master processing system according to claim 31, wherein the support structure includes a plurality of support members along outer edges thereof that engage a surface when the apparatus is placed on such surface.

33. A master processing apparatus for performing a master processing operation in conjunction with a cartridge assembly comprising a cartridge body and first and second feed rolls rotatably mounted to the cartridge body, the apparatus comprising:
a frame constructed to enable the cartridge body to removably mount thereto; and
an ejector mechanism constructed and arranged to eject the cartridge assembly in an outward direction with respect to the frame.

34. A master processing apparatus according to claim 33, further comprising a master processing assembly constructed and arranged such that a master can be inserted into the master processing assembly together with stock materials unwound from respective feed rolls and disposed on opposing sides of the master;
the master processing assembly being constructed and arranged to perform the master processing operation, wherein the master processing assembly causes adhesive bonding between the master and the stock materials being fed therein.

35. A master processing apparatus according to claim 33, wherein the frame is of a size suitable to be held in one hand of a user.

36. A master processing apparatus according to claim 33, wherein the frame provides a first lock structure and the cartridge body provides a second lock structure, the first and second lock structures engaging with one another to releasably secure the cartridge assembly to the frame.

37. A master processing apparatus according to claim 36, wherein the first lock structure is a pair of recesses provided on side walls of the frame and the second lock structure is a pair of tabs provided on the cartridge body, the tabs engaging within the recesses to releasably secure the cartridge assembly to the frame.

38. A master processing apparatus according to claim 37, wherein the ejector mechanism includes a pair of pusher members that are slidably mounted within the pair of recesses on the side walls of the frame, the ejector mechanism being movable between (a) an inoperative position in which the pusher members are positioned within the recesses to allow the tabs of the cartridge assembly to move into the recesses of the frame to lock and releasably secure the cartridge assembly within the frame, and (b) an operative position in which the pusher members are moved into engagement with the tabs of the cartridge assembly to apply a force to the tabs that pushes the tabs from the recesses to eject the cartridge assembly from the frame.

39. A master processing apparatus according to claim 38, wherein the ejector mechanism includes resilient arm members that bias the pusher members into the inoperative position.

40. A master processing apparatus according to claim 38, wherein the pusher members are manually moved between the inoperative and operative positions.

41. A master processing apparatus according to claim 38, wherein the pusher members are positioned on an exterior portion of the frame.

42. A master processing apparatus according to claim 34, further comprising an input tray having a substrate supporting surface pivotally connected to the frame adjacent a feed opening thereof, the input tray selectively moveable between (a) an operative position in which the input tray extends outwardly from the frame and the substrate supporting surface thereof is positioned to support a master in a substantially flat condition as the master is being fed into the master processing assembly, and (b) an inoperative position in which the input tray is positioned in covering relation to the feed opening of the frame.

43. A master processing apparatus according to claim 33, further comprising a support structure pivotally connected to the frame adjacent a discharge opening thereof, the support structure selectively movable between (a) an operative position in which the support structure extends generally perpendicular to the frame so as to rigidly support the apparatus in an upright position, and (b) an inoperative position in which the support structure is positioned in covering relation to the discharge opening of the frame.

44. A master processing apparatus according to claim 43, wherein the support structure includes a plurality of support members along outer edges thereof that engage a surface when the apparatus is placed on such surface.

45. A master processing system comprising:
a frame providing a first lock structure;
a cartridge assembly comprising a cartridge body and first and second feed rolls rotatably mounted to the cartridge body, the first and second feed rolls carrying respective supplies of first and second stock material, at least one of the stock materials having a layer of adhesive disposed thereon, the cartridge body providing a second lock structure and being mountable to the frame such that the first and second lock structures engage with one another to releasably secure the cartridge assembly to the frame;
a master processing assembly constructed and arranged such that a master can be inserted into the master processing assembly together with the stock materials unwound from their respective feed rolls and disposed on opposing sides of the master;
the master processing assembly being constructed and arranged to perform a master processing operation, wherein the master processing assembly causes adhesive bonding between the master and the stock materials being fed therein; and
a manually engagable pusher member constructed and arranged to disengage the first and second lock structures to release the cartridge assembly from the frame.

46. A master processing system according to claim 45, wherein the frame is of a size suitable to be held in one hand of a user.

47. A master processing system according to claim 45, wherein the first lock structure is a pair of recesses provided on side walls of the frame and the second lock structure is a pair of tabs provided on the cartridge body, the tabs engaging within the recesses to releasably secure the cartridge assembly to the frame.

48. A master processing system according to claim 47, wherein the pusher member is a first pusher member and further comprising a second manually engagable pusher member, the first and second pusher members being slidably mounted within the pair of recesses on the side walls of the frame, the first and second pusher members being movable between (a) an inoperative position in which the pusher members are positioned within the recesses to allow the tabs of the cartridge assembly to move into the recesses of the frame to lock and releasably secure the cartridge assembly within the frame, and (b) an operative position in which the pusher members are moved into engagement with the tabs of the cartridge assembly to apply a force to the tabs that pushes the tabs from the recesses to release the cartridge assembly from the frame.

49. A master processing system according to claim 48, wherein the pusher members includes resilient arm members that bias the pusher members into the inoperative position.

50. A master processing system according to claim 48, wherein the pusher members are manually moved between the inoperative and operative positions.

51. A master processing system according to claim 48, wherein the pusher members are positioned on an exterior portion of the frame.

52. A master processing system according to claim 45, wherein the cartridge body includes a pair of first feed roll supports to receive the first feed roll therebetween and a pair of second feed roll supports to receive the second feed roll therebetween.

53. A master processing system according to claim 45, wherein the cartridge body includes a manually engagable portion on a free end thereof to facilitate insertion of the cartridge assembly into the frame.

54. A master processing system according to claim 45, wherein the master processing assembly is provided on the cartridge assembly.

55. A master processing system according to claim 45, wherein the master processing assembly includes upper and lower portions configured to press the master and stock materials into engagement with one another as the master and stock materials are fed therebetween.

56. A master processing system according to claim 45, further comprising a cutting blade at a discharge opening thereof that is operable to sever a final product containing a master from the stock materials.

57. A master processing system according to claim 45, further comprising an input tray having a substrate supporting surface pivotally connected to the frame adjacent a feed opening thereof, the input tray selectively moveable between (a) an operative position in which the input tray extends outwardly from the frame and the substrate supporting surface thereof is positioned to support a master in a substantially flat condition as the master is being fed into the master processing assembly, and (b) an inoperative position in which the input tray is positioned in covering relation to the feed opening of the frame.

58. A master processing system according to claim 45, further comprising a support structure pivotally connected to the frame adjacent a discharge opening thereof, the support structure selectively movable between (a) an operative position in which the support structure extends generally perpendicular to the frame so as to rigidly support the apparatus in an upright position, and (b) an inoperative position in which the support structure is positioned in covering relation to the discharge opening of the frame.

59. A master processing system according to claim 58, wherein the support structure includes a plurality of support members along outer edges thereof that engage a surface when the apparatus is placed on such surface.

\* \* \* \* \*